(12) United States Patent
Mekhitarian et al.

(10) Patent No.: US 6,278,359 B1
(45) Date of Patent: Aug. 21, 2001

(54) MOTOR VEHICLE DIAGNOSTIC SYSTEM

(76) Inventors: Paul Mekhitarian, 2115 La Canada Crest Dr. #103, La Canada, CA (US) 91011; Vladimir Mkrttchian, 4860 Newcastle Ave., Encino, CA (US) 91316

(*) Notice: Subject to any disclaimer, the term of this patent is extended or adjusted under 35 U.S.C. 154(b) by 0 days.

(21) Appl. No.: 09/557,199

(22) Filed: Apr. 21, 2000

(51) Int. Cl.[7] .................................................. B60Q 1/00
(52) U.S. Cl. .................. 340/436; 340/690; 200/61.45 R
(58) Field of Search ..................................... 340/429, 436, 340/438, 480, 669, 686.1, 688, 689, 690; 200/61.45 M, 61.44, 52 R, 61.52 R, 61.45 R

(56) References Cited

U.S. PATENT DOCUMENTS

| | | |
|---|---|---|
| 3,949,357 | 4/1976 | Hosaka .................................. 340/436 |
| 4,944,401 | 7/1990 | Groenewegen ......................... 206/521 |
| 5,445,024 | 8/1995 | Riley, Jr. et al. ......................... 73/489 |
| 5,581,060 * | 12/1996 | Kobayashi et al. .......... 200/61.45 M |
| 5,664,665 * | 9/1997 | Kobayashi et al. .......... 200/61.45 M |
| 5,847,661 | 12/1998 | Ricci .................................... 340/902 |

* cited by examiner

Primary Examiner—Van T. Trieu
(74) Attorney, Agent, or Firm—Goldstein Law Offices P.C.

(57) ABSTRACT

A motor vehicle diagnostic system including a main housing constructed of a durable material that will protect its content. The main housing has a hollow interior. Sensing and diagnosing means are freely disposed within the hollow interior of the main housing. The sensing and diagnosing means includes an activation button. A suspension mechanism couples the sensing and diagnosing means to the main housing. An activation mechanism is disposed within the hollow interior of the main housing. The activation mechanism is positioned whereby upward movement of the sensing and diagnosing means will cause the activation mechanism to abut the activation button for activation of the sensing and diagnosing means.

6 Claims, 2 Drawing Sheets

MOTOR VEHICLE DIAGNOSTIC SYSTEM

BACKGROUND OF THE INVENTION

The present invention relates to a motor vehicle diagnostic system and more particularly pertains to recording relevant information concerning operation of a motor vehicle at the occurrence of an accident.

The use of vehicle recording devices is known in the prior art. More specifically, vehicle recording devices heretofore devised and utilized for the purpose of storing historical information are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,445,024 to Riley, Jr. discloses an automobile recorder capable of storing information necessary for analyzing conditions prior to an accident. U.S. Pat. No. 3,949,357 to Hosaka discloses an operation recorder for use with a motor vehicle for recording the functions of a safety device, such as an airbag, in a collision. U.S. Pat. No. 5,847,661 to Ricci discloses a data acquisition capable of storing historical data, such as car and traffic conditions, that can be used as a black box in case of a collision. U.S. Pat. No. 4,944,401 to Groenewegen discloses a crash survivable enclosure used with various types of vehicles over land or water.

While these devices fulfill their respective, particular objective and requirements, the aforementioned patents do not describe a motor vehicle diagnostic system for recording relevant information concerning operation of a motor vehicle at the occurrence of an accident.

In this respect, the motor vehicle diagnostic system according to the present invention substantially departs from the conventional concepts and designs of the prior art, and in doing so provides an apparatus primarily developed for the purpose of recording relevant information concerning operation of a motor vehicle at the occurrence of an accident.

Therefore, it can be appreciated that there exists a continuing need for a new and improved motor vehicle diagnostic system which can be used for recording relevant information concerning operation of a motor vehicle at the occurrence of an accident. In this regard, the present invention substantially fulfills this need.

SUMMARY OF THE INVENTION

In the view of the foregoing disadvantages inherent in the known types of vehicle recording devices now present in the prior art, the present invention provides an improved motor vehicle diagnostic system. As such, the general purpose of the present invention, which will be described subsequently in greater detail, is to provide a new and improved motor vehicle diagnostic system which has all the advantages of the prior art and none of the disadvantages.

To attain this, the present invention essentially comprises a main housing constructed of a durable material that will protect its content. The main housing has a hollow interior. The main housing has a generally square configuration defined by a top wall, a bottom wall, four side walls, and four corners. The four corners each have a tab secured thereto extending within the hollow interior. Each of the tabs have an aperture therethrough. Sensing and diagnosing means are freely disposed within the hollow interior of the main housing. The sensing and diagnosing means are disposed within a circular housing. The circular housing has four radially extending tabs disposed at ninety degree intervals extending outwardly therefrom. Each of the tabs have an aperture therethrough. The sensing and diagnosing means includes an activation button extending outwardly of the circular housing. A suspension mechanism couples the sensing and diagnosing means to the main housing. The suspension mechanism is comprised of four springs coupled with the apertures of the tabs of the main housing and with the apertures of the tabs of the circular housing of the sensing and diagnosing means. The springs suspends the circular housing freely within the hollow interior of the main housing. An activation mechanism is disposed within the hollow interior of the main housing. The activation mechanism is comprised of an elongated arm extending inwardly from one of the side walls of the main housing. The elongated arm has a free end disposed above the activation button of the sensing and diagnosing means. The free end has a downwardly directed contact point whereby upward movement of the circular housing will cause the contact point to abut the activation button for activation of the sensing and diagnosing means.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motor vehicle diagnostic system which has all the advantages of the prior art vehicle recording devices and none of the disadvantages.

It is another object of the present invention to provide a new and improved motor vehicle diagnostic system which may be easily and efficiently manufactured and marketed.

It is a further object of the present invention to provide a new and improved motor vehicle diagnostic system which is of durable and reliable construction.

An even further object of the present invention is to provide a new and improved motor vehicle diagnostic system which is susceptible of a low cost of manufacture with regard to both materials and labor, and which accordingly is then susceptible of low prices of sale to the consuming public, thereby making such a motor vehicle diagnostic system economically available to the buying public.

Even still another object of the present invention is to provide a new and improved motor vehicle diagnostic system for recording relevant information concerning operation of a motor vehicle at the occurrence of an accident.

Lastly, it is an object of the present invention to provide a new and improved motor vehicle diagnostic system including a main housing constructed of a durable material that will protect its content. The main housing has a hollow interior. Sensing and diagnosing means are freely disposed within the hollow interior of the main housing. The sensing and diagnosing means includes an activation button. A suspension mechanism couples the sensing and diagnosing means to the main housing. An activation mechanism is disposed within the hollow interior of the main housing. The activation mechanism is positioned whereby upward movement of the sensing and diagnosing means will cause the activation mechanism to abut the activation button for activation of the sensing and diagnosing means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
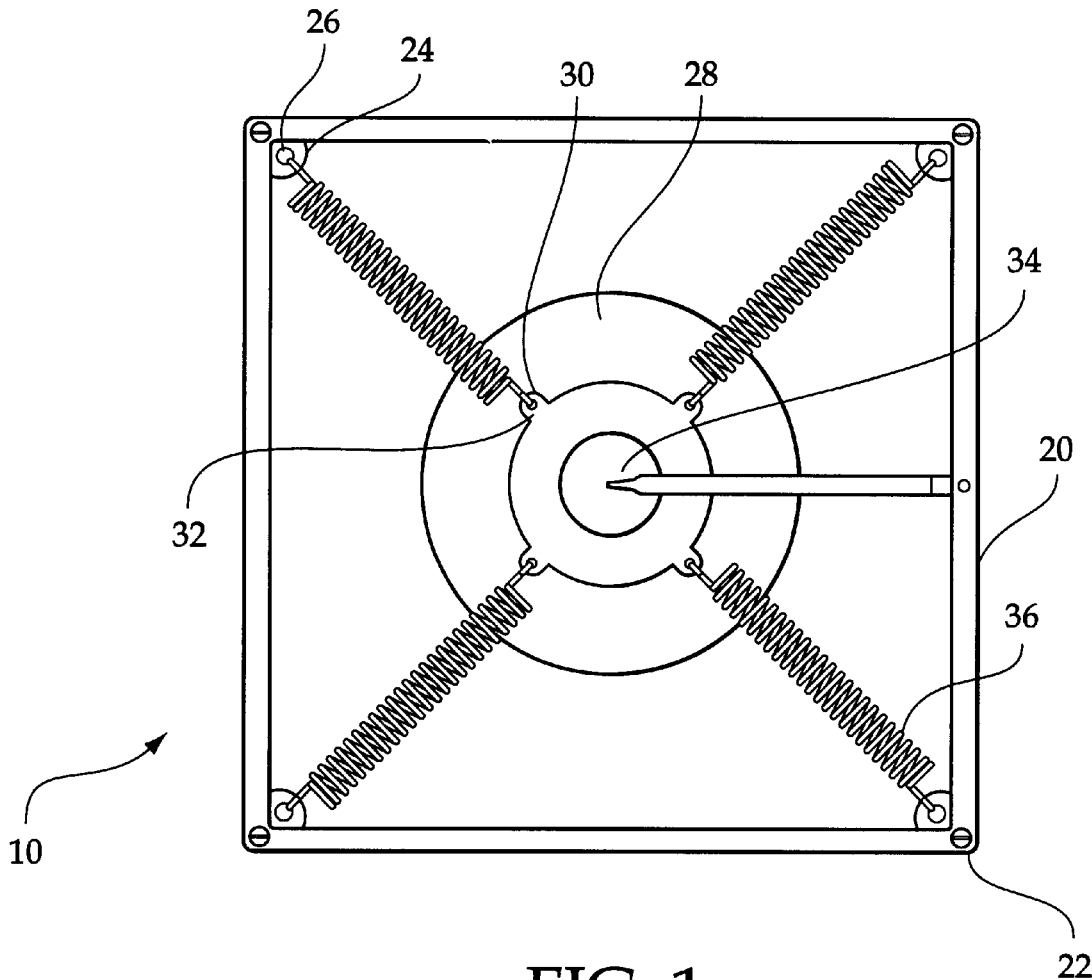
FIG. 1 is a perspective view of the preferred embodiment of the motor vehicle diagnostic system constructed in accordance with the principles of the present invention.
Figure 2:
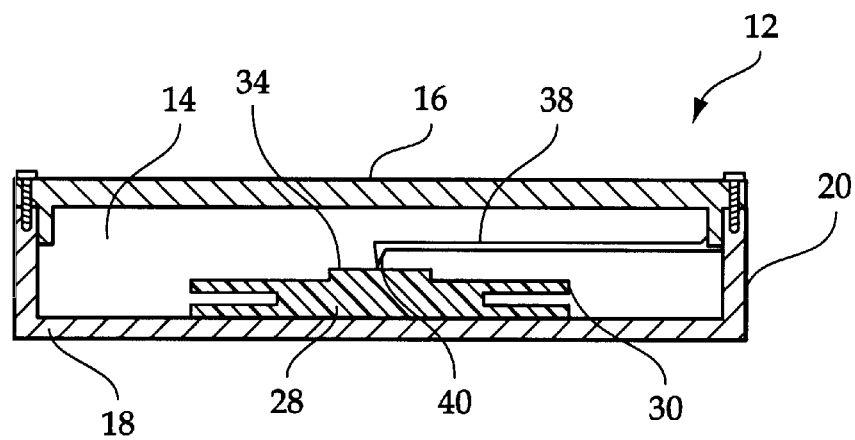
FIG. 2 is a cross-sectional side view of the present invention.
Figure 3:
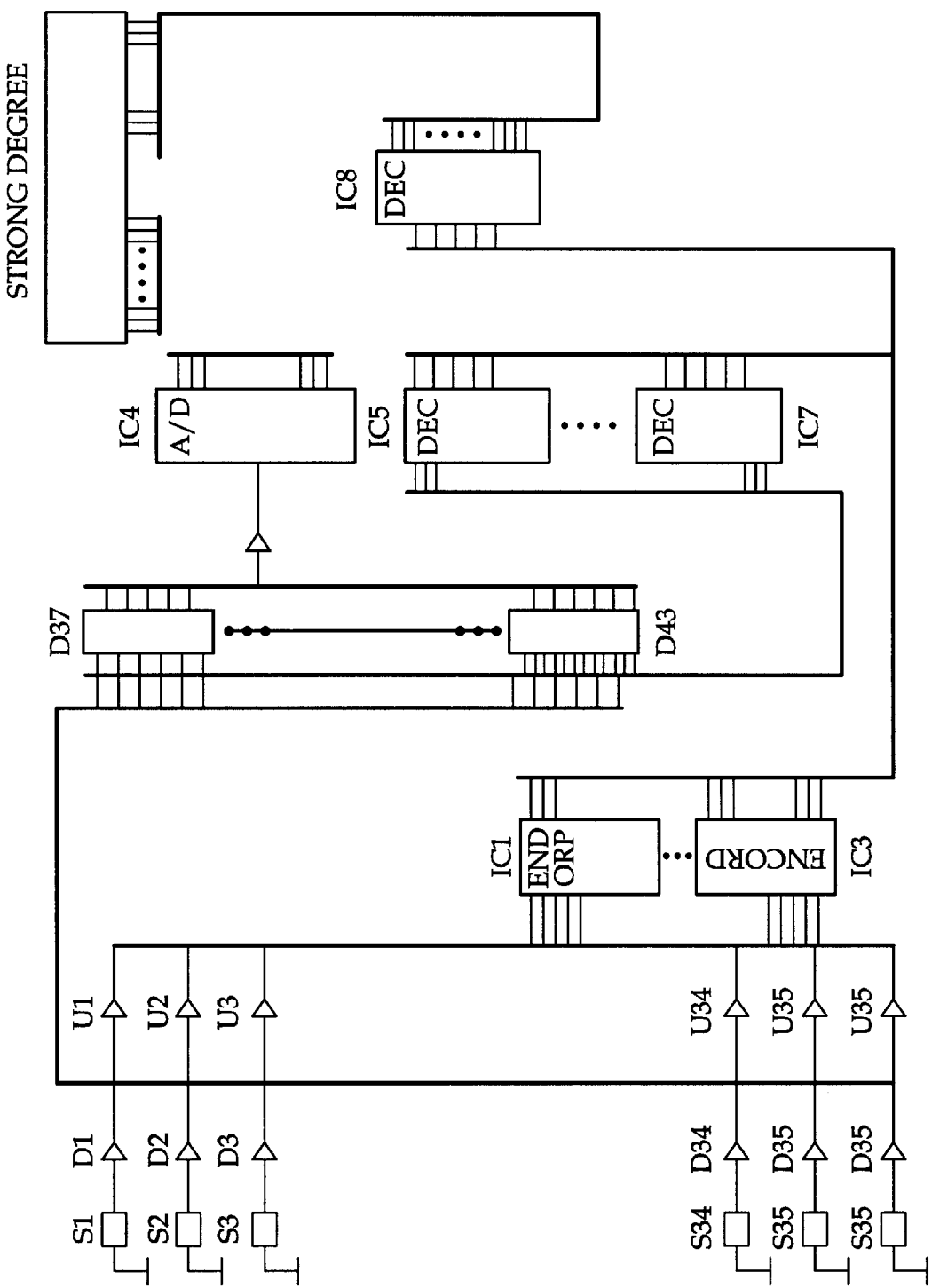
FIG. 3 is a schematic illustration of the present invention.

With reference now to the drawings, and in particular, to FIGS. 1 through 3 thereof, the preferred embodiment of the new and improved motor vehicle diagnostic system embodying the principles and concepts of the present invention and generally designated by the reference number 10 will be described.

Specifically, it will be noted in the various Figures that the device relates to a motor vehicle diagnostic system for recording relevant information concerning operation of a motor vehicle at the occurrence of an accident. In its broadest context, the device consists of a main housing, sensing and diagnosing means, a suspension mechanism, and an activation mechanism. Such components are individually configured and correlated with respect to each other so as to attain the desired objective.

The main housing 12 is constructed of a durable material that will protect its content. The main housing 12 is preferably constructed of similar material to that of the "black box" of airplanes so as to insure the contents are protected. The main housing 12 has a hollow interior 14. The main housing 12 has a generally square configuration defined by a top wall 16, a bottom wall 18, four side walls 20, and four corners 22. The top wall 16 will be removable from the main housing 12 in order to gain access to the hollow interior 14. The four corners 22 each have a tab 24 secured thereto extending within the hollow interior 14. Each of the tabs 24 have an aperture 26 therethrough.

The sensing and diagnosing means are freely disposed within the hollow interior 14 of the main housing 12. The sensing and diagnosing means are disposed within a circular housing 28. The circular housing 28 has four radially extending tabs 30 disposed at ninety degree intervals extending outwardly therefrom. Each of the tabs 30 have an aperture 32 therethrough. The sensing and diagnosing means includes an activation button 34 extending outwardly of the circular housing 28. The sensing and diagnosing means is comprised of circuitry that is in communication with the engine and diagnostic system of a motor vehicle. Note FIG. 3. Thus, upon activation, the circuitry will be able to diagnose and record a problem that the motor vehicle had that resulted in an accident. The recording of this information will allow for it's easy removal and analysis.

The suspension mechanism couples the sensing and diagnosing means to the main housing 12. The suspension mechanism is comprised of four springs 36 coupled with the apertures 26 of the tabs 24 of the main housing 12 and with the apertures 32 of the tabs 30 of the circular housing 28 of the sensing and diagnosing means. The springs 36 suspend the circular housing 28 freely within the hollow interior 14 of the main housing 12. Thus, upon an accident occurring, the suspension mechanism will allow the circular housing 28 to move up and down.

The activation mechanism is disposed within the hollow interior 14 of the main housing 12. The activation mechanism is comprised of an elongated arm 38 extending inwardly from one of the side walls 20 of the main housing 12. The elongated arm 38 has a free end disposed above the activation button 34 of the sensing and diagnosing means. The free end has a downwardly directed contact point 40 whereby upward movement of the circular housing 28 will cause the contact point 40 to abut the activation button 34 for activation of the sensing and diagnosing means.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A motor vehicle diagnostic system for recording relevant information concerning operation of a motor vehicle at the occurrence of an accident comprising, in combination:

a main housing constructed of a durable material that will protect its content, the main housing having a hollow interior, the main housing having a generally square configuration defined by a top wall, a bottom wall, four side walls, and four corners, the four corners each having a tab secured thereto extending within the hollow interior, each of the tabs having an aperture therethrough;

sensing and diagnosing means freely disposed within the hollow interior of the main housing, the sensing and diagnosing means being disposed within a circular housing, the circular housing having four radially extending tabs disposed at ninety degree intervals extending outwardly therefrom, each of the tabs having an aperture therethrough, the sensing and diagnosing means including an activation button extending outwardly of the circular housing;

a suspension mechanism coupling the sensing and diagnosing means to the main housing, the suspension mechanism comprised of four springs coupled with the apertures of the tabs of the main housing and with the apertures of the tabs of the circular housing of the sensing and diagnosing means, the springs suspending the circular housing freely within the hollow interior of the main housing;

an activation mechanism disposed within the hollow interior of the main housing, the activation mechanism comprised of an elongated arm extending inwardly from one of the side walls of the main housing, the elongated arm having a free end disposed above the activation button of the sensing and diagnosing means, the free end having a downwardly directed contact point whereby upward movement of the circular housing will cause the contact point to abut the activation button for activation of the sensing and diagnosing means.

2. A motor vehicle diagnostic system for recording relevant information concerning operation of a motor vehicle at the occurrence of an accident comprising, in combination:

a main housing constructed of a durable material that will protect its content, the main housing having a hollow interior;

sensing and diagnosing means freely disposed within the hollow interior of the main housing, the sensing and diagnosing means including an activation button;

a suspension mechanism coupling the sensing and diagnosing means to the main housing;

an activation mechanism disposed within the hollow interior of the main housing, the activation mechanism being positioned whereby upward movement of the sensing and diagnosing means will cause the activation mechanism to abut the activation button for activation of the sensing and diagnosing means.

3. The motor vehicle diagnostic system as set forth in claim 2 wherein the four corners of the main housing each have a tab secured thereto extending within the hollow interior, each of the tabs having an aperture therethrough for coupling to the suspension mechanism.

4. The motor vehicle diagnostic system as set forth in claim 2 wherein the sensing and diagnosing means are disposed within a circular housing, the circular housing having four radially extending tabs disposed at ninety degree intervals extending outwardly therefrom, each of the tabs having an aperture therethrough for coupling to the suspension mechanism.

5. The motor vehicle diagnostic system as set forth in claim 2 wherein the suspension mechanism is comprised of four springs extending between the main housing and the sensing and diagnosing means, the springs suspending the circular housing freely within the hollow interior of the main housing.

6. The motor vehicle diagnostic system as set forth in claim 2 wherein the activation mechanism is comprised of an elongated arm extending inwardly from the main housing, the elongated arm having a free end disposed above the activation button of the sensing and diagnosing means, the free end having a downwardly directed contact point whereby upward movement of the sensing and diagnosing means will cause the contact point to abut the activation button for activation of the sensing and diagnosing means.

* * * * *